(12) United States Patent
Erdos et al.

(10) Patent No.: US 9,574,440 B2
(45) Date of Patent: Feb. 21, 2017

(54) FLOW SWITCH ALGORITHM FOR PULSER DRIVER

(71) Applicant: REME, L.L.C., Conroe, TX (US)

(72) Inventors: Abraham Erdos, Houston, TX (US); Kenneth Miller, Houston, TX (US); Brad Munoz, Houston, TX (US); Joshua Carter, Conroe, TX (US); James Mathieson, Conroe, TX (US)

(73) Assignee: REME, L.L.C., Conroe, TX (US)

( * ) Notice: Subject to any disclaimer, the term of this patent is extended or adjusted under 35 U.S.C. 154(b) by 0 days.

(21) Appl. No.: 14/877,009

(22) Filed: Oct. 7, 2015

(65) Prior Publication Data

US 2016/0097249 A1 Apr. 7, 2016

Related U.S. Application Data

(60) Provisional application No. 62/060,958, filed on Oct. 7, 2014.

(51) Int. Cl.
*E21B 47/10* (2012.01)
*E21B 47/18* (2012.01)
*G01V 5/04* (2006.01)

(52) U.S. Cl.
CPC ............... *E21B 47/18* (2013.01); *G01V 5/045* (2013.01)

(58) Field of Classification Search
CPC ........................... G01N 21/31; G01N 33/2823
USPC ....................................................... 73/152.19
See application file for complete search history.

(56) References Cited

U.S. PATENT DOCUMENTS

| | | | |
|---|---|---|---|
| 2004/0040746 A1* | 3/2004 | Niedermayr | E21B 21/08 175/38 |
| 2005/0194183 A1 | 9/2005 | Gleitman et al. | |
| 2005/0209782 A1* | 9/2005 | Moriarty | E21B 47/18 702/6 |
| 2007/0056771 A1* | 3/2007 | Gopalan | E21B 47/187 175/40 |
| 2007/0189119 A1 | 8/2007 | Klotz et al. | |
| 2009/0063055 A1 | 3/2009 | Schneider et al. | |
| 2009/0115623 A1* | 5/2009 | Macpherson | G01V 11/002 340/853.1 |
| 2012/0217067 A1* | 8/2012 | Mebane, III | E21B 44/02 175/57 |
| 2013/0008648 A1* | 1/2013 | Lovorn | E21B 21/103 166/250.01 |
| 2013/0248247 A1* | 9/2013 | Sugiura | E21B 47/12 175/24 |
| 2014/0124195 A1 | 5/2014 | Tahoun et al. | |

(Continued)

OTHER PUBLICATIONS

PCT, International Search Report and Written Opinion, PCT/US2015/054382, Dec. 31, 2015.

*Primary Examiner* — Lisa Caputo
*Assistant Examiner* — Jamel Williams
(74) *Attorney, Agent, or Firm* — Morgan, Lewis & Bockius LLP

(57) ABSTRACT

A pulser driver assembly of a measurement-while-drilling tool that includes an improved flow switch is disclosed. The flow switch uses multiple accelerometers of different types that measure acceleration changes in a system. The accelerometer data is then filtered and processed by an onboard microcontroller. The filtered data is then passed to a fuzzy logic voting algorithm which systematically and robustly characterizes the signal, and identifies the flow state.

12 Claims, 4 Drawing Sheets

(56) References Cited

U.S. PATENT DOCUMENTS

| | | | | |
|---|---|---|---|---|
| 2014/0265619 A1* | 9/2014 | Chau | ............ | H02J 17/00 307/104 |
| 2015/0096805 A1* | 4/2015 | Kruspe | ............ | E21B 44/005 175/45 |
| 2015/0331132 A1* | 11/2015 | Gao | ............ | E21B 47/101 73/152.05 |
| 2015/0331138 A1* | 11/2015 | Estes | ............ | G01V 3/26 324/346 |

* cited by examiner

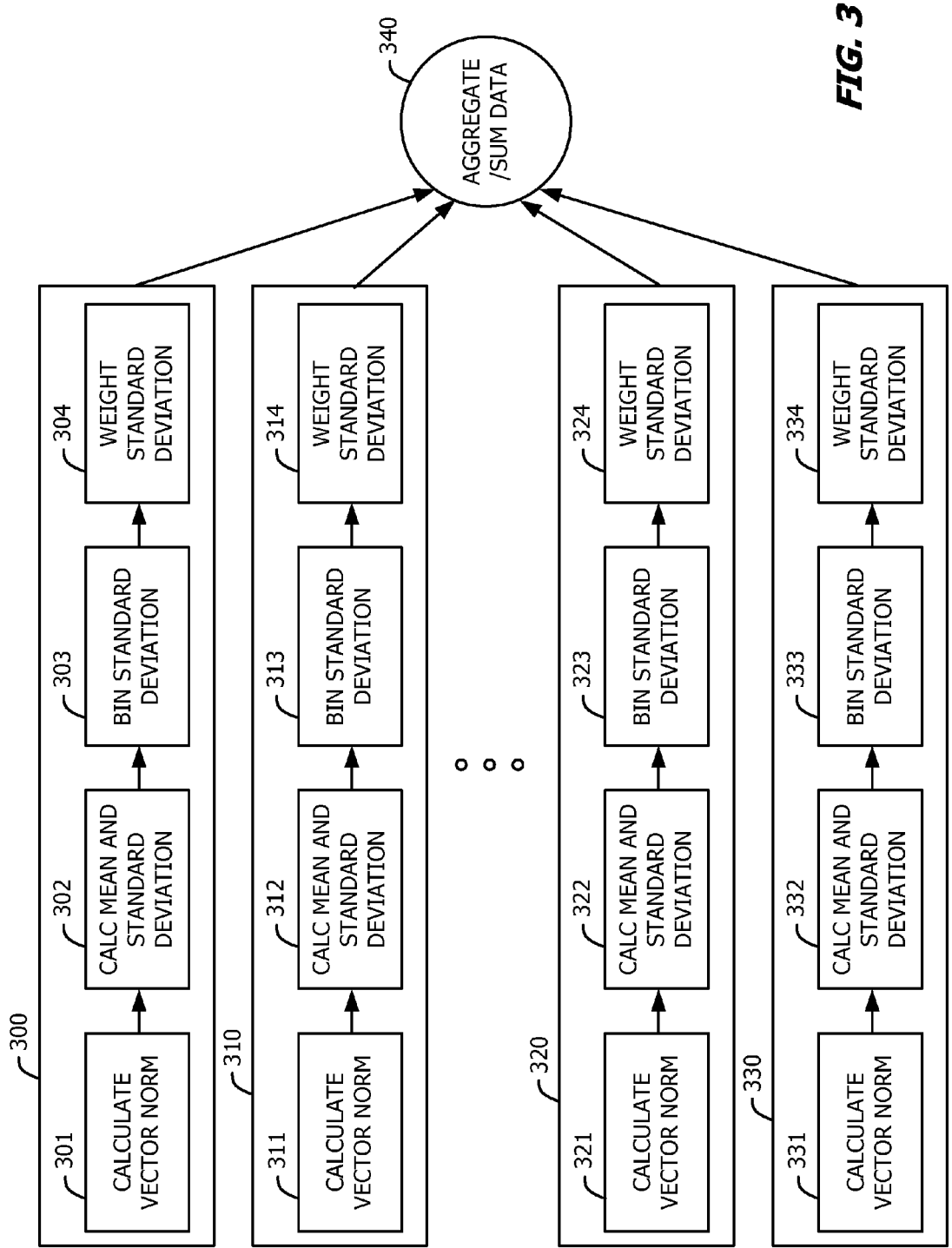

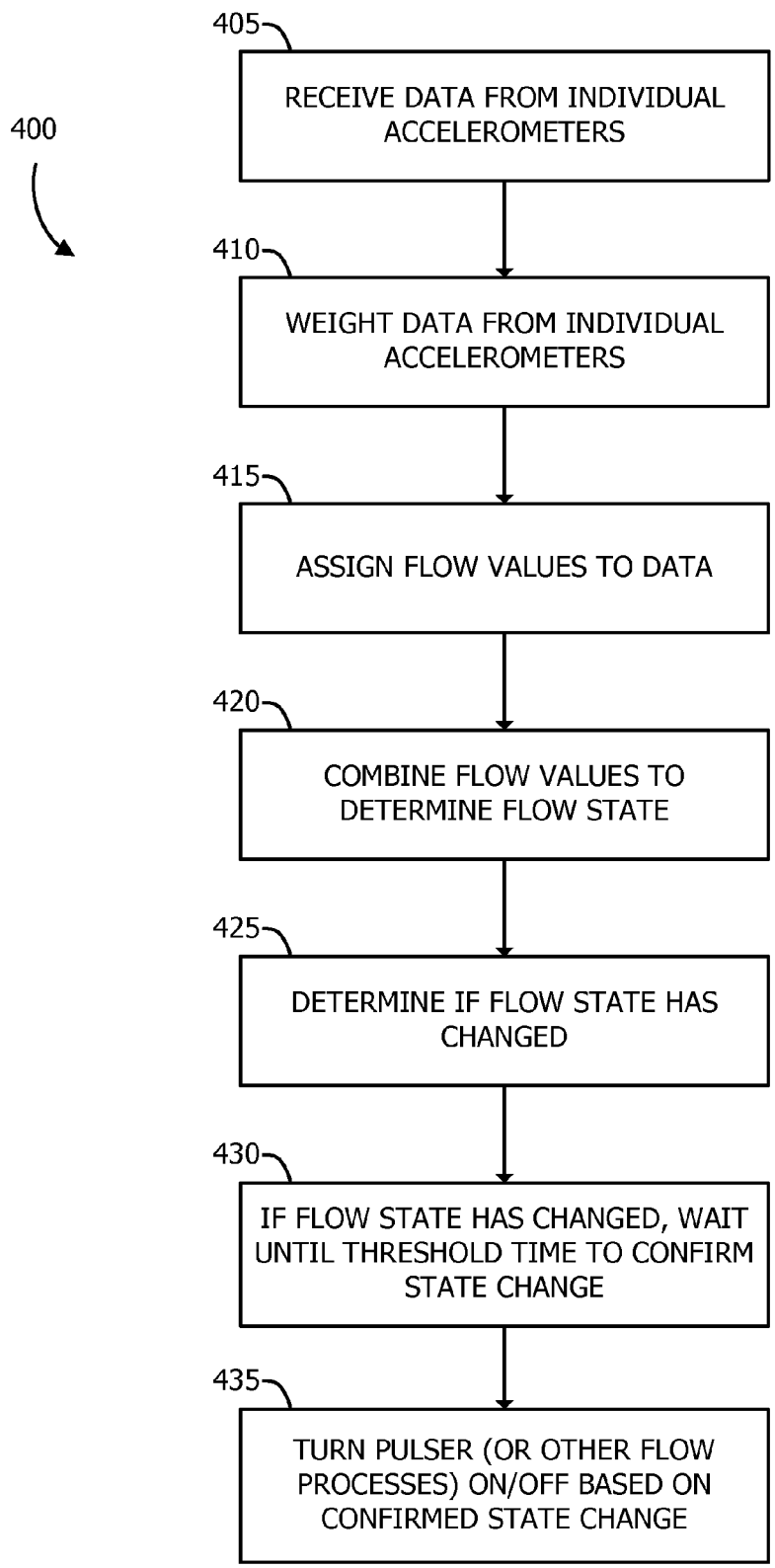

FLOW SWITCH ALGORITHM FOR PULSER DRIVER

BACKGROUND

1. Field of the Invention

The present invention relates to measurement-while-drilling and logging-while-drilling technologies used in the oil and gas industry, and more specifically to downhole mud pulse telemetry assemblies.

2. Description of the Related Art

In downhole drilling operations, tools are lowered deep into the ground to perform various functions, such as drilling, measuring related data, and logging the data. Measurement-while-drilling allows for the surface acquisition of downhole data during drilling. Boreholes may be thousands of feet in length, and may encompass different geological rock formations. Due to the length of the drill string, communication between surface equipment and downhole tools is limited during drilling applications. In modern measurement-while-drilling systems, information is telemetered to the surface primarily through either mud pulse, electromagnetic, or acoustic telemetry systems. These telemetry systems may transmit data regarding the location, orientation, and inclination of the drill string, the type of rock formation that is being drilled, the rotational speed of the drill string, etc.

Mud pulse telemetry systems are commonly used to communicate between a downhole tool and the uphole operator during drilling applications. Data to be transmitted is encoded into a predetermined encoding scheme. In mud pulse telemetry systems, a pulser is used to generate surges, or pulses, in the drilling fluid, generically known as mud, which is flowing through the drill string. The pulser generates pressure pulses by constricting a flow path in the fluid in the borehole. The constrictions are created and then released in the drill string with a specific timing to generate patterns to encode data based on the timing of the pressure pulses.

A common type of pulser is a hydraulic, or tensor, pulser. In a hydraulic pulser, pulser driver circuitry activates a solenoid. The solenoid actuation causes a poppet valve to open, which causes a signal shaft to move and create another restriction at the bottom of the tool. This restriction causes a pulse to be generated through the fluid.

The pressure pulses propagate through the fluid from the downhole tool to the surface. Pressure sensitive transducers at the surface can detect the encoded pulses and decode the pulses to arrive at the original data. The real time capture and transmission of data allows operators at the surface to make real time decisions regarding drilling operations. The mud pulse telemetry communication may be bidirectional, and surface equipment may generate pulses that are telemetered downhole to steer or control a downhole drill string.

Mud pulse telemetry systems must have fluid flowing through the system in order to generate pressure pulses and telemeter data. In order to sense whether drilling fluid is being circulated, vibration sensitive devices are incorporated into the pulser driving circuitry. These vibration sensitive devices, generically known as flow switches, send a signal to the measurement-while-drilling control circuitry, generically known as the microprocessor unit (MPU), when the flow state changes from off to on.

For the effective operation of downhole tools, accurate and robust flow switches are essential. Mud pulse telemetry tools operate on battery power, so unnecessary triggering of the pulser should be avoided to conserve power. Further, without flow switches to accurately determine the flow state, the pulser could trigger without fluid flow and fail to convey a pulse to the surface, resulting in the potential loss of encoded data. The following invention relates to the development of a "smart" flow switch which implements algorithms to accurately and robustly determine the flow state.

SUMMARY OF THE INVENTION

The following invention presents a novel application of fuzzy logic to evaluate the flow state during the drilling operation. Several accelerometers located on the pulser driver are monitored during the drilling process. The accelerometer data is then filtered and processed by an onboard microcontroller. The filtered data is then passed to a fuzzy logic voting algorithm which systematically and robustly characterizes the signal, and evaluates the flow state.

BRIEF DESCRIPTION OF THE DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 3 is a block diagram of one exemplary flow switch voting algorithm.

FIG. 4 is a block diagram of one exemplary method of implementing a flow switch algorithm.

DETAILED DESCRIPTION

Figure 1:
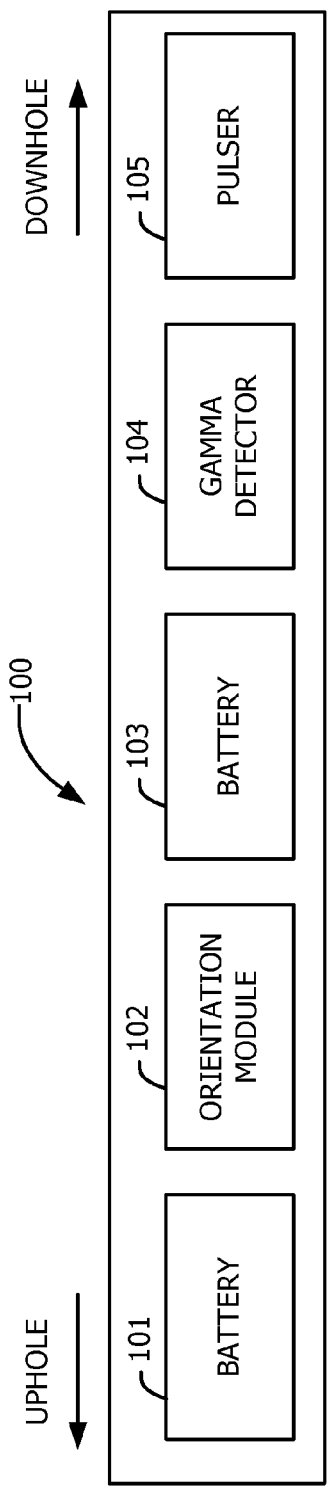
FIG. 1 is a schematic view of a typical MWD tool configuration.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

FIG. 1 shows a typical battery-powered downhole measurement tool 100. The tool 100 is typically lowered into a well through the inner diameter of the drill string and set into a mule shoe sub, where the uphole portion of the tool 100 includes battery 101 and the downhole portion of the tool 100 includes the pulser 105. The tool 100 additionally includes an orientation module 102 to determine the orientation of the tool, and a gamma ray detector 104 which is able to measure naturally occurring radiation emitted from rock formations downhole. The orientation module 102 may contain a multiprocessor unit, memory, and I/O to communicate with and control other portions of the tool, including the pulser 105. Batteries 101 and 103 act as power supplies for the components of tool 100. The batteries 101 and 103 may be arranged near each other. The pulser 105 creates restrictions in the drill pipe that subsequently generate pressure pulses that propagate to the surface.

Figure 2A:
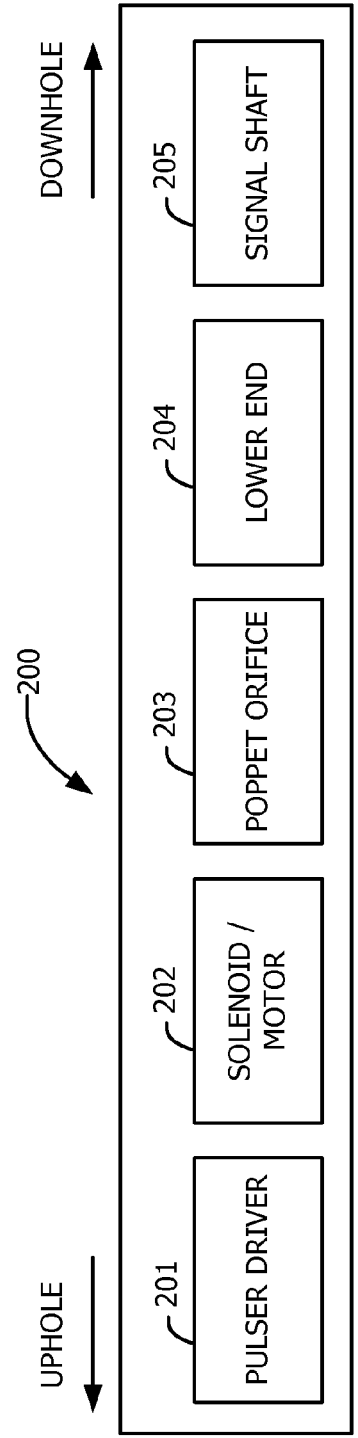
FIG. 2A is a schematic view of one exemplary pulser tool configuration that practices the present invention.

As shown in FIG. 2A, one possible embodiment of a pulser 200 practicing the present invention may have several discrete sections, including the pulser driver 201, solenoid 202, poppet orifice 203, lower end 204, and signal shaft 205. The pulser driver circuitry 201 activates the solenoid 202, which then opens a poppet valve at the poppet orifice 203. In one embodiment a motor may be used to open the poppet valve. The differential pressure created after the poppet valve opens causes the signal shaft 205 to actuate, and the poppet orifice 203 covered by the poppet valve is closed. Thus, the actuation of the solenoid 202 starts the pressure pulse generation.

Figure 2B:
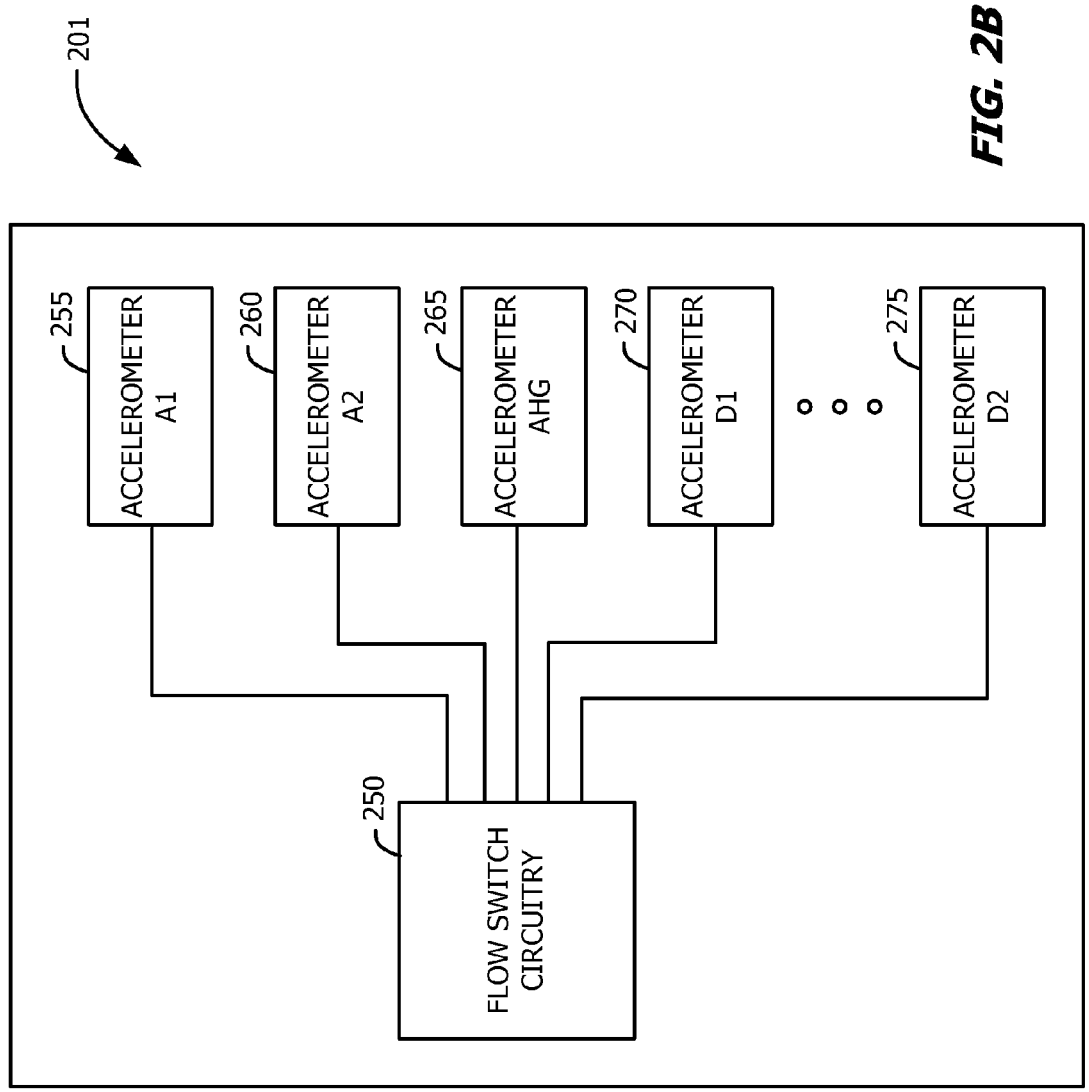
FIG. 2B is a schematic view of the flow switch section of the pulser driver depicted in FIG. 2A.

FIG. 2B shows a schematic block diagram of a flow switch portion of the pulser driver 201 shown in FIG. 2A. In one embodiment, the flow switch circuitry 250, which also may be called the flow sense circuitry, may be located on the pulser driver board. In other embodiments, the flow switch circuitry 250 may be located in other components of the MWD tool, or it may be distributed around the tool. Flow switch circuitry 250 may include memory, a microprocessor or microcontroller, and input/output communications ports to other components, such as the orientation module 102 and the gamma ray detector 104 shown in FIG. 1. Firmware that controls the pulser is stored in onboard memory and run by a microprocessor on the board. As noted above, when the tool 100 is operating downhole, the gamma ray detector 104 measures the naturally occurring formation radiation. While much of this data may be stored in onboard memory in the tool, some or all of it may be communicated uphole by mud telemetry using the pulser 105. Similarly, the orientation module 102 measures orientation and azimuthal data, and some or all of that data may be communicated uphole by mud telemetry. Part of the decision on whether to communicate real-time data at any particular time may depend on whether the flow switch circuitry 250 determines that mud is flowing (and thus whether a mud pulse signal may be generated at that time). In other instances, certain data may be queued for transmission and then transmitted at a time when the flow switch determines that mud is flowing and during which the pulser driver is active. Flow processes other than telemetry may also be triggered by the determination that mud is flowing. For example, data acquisition functions, such as collecting formation information by detecting gamma rays from the gamma ray detector 104 or identifying the direction and orientation of the tool by the orientation module 102, may be triggered by the determination of whether fluid is flowing.

To determine whether mud is flowing, the flow switch circuitry 250 uses a voting algorithm to aggregate flow data captured from multiple accelerometers in the pulser driver 201. While any number of accelerometers may be used, in the embodiment shown in FIG. 2B, five accelerometers (255, 260, 265, 270, and 275) are considered for the voting algorithm. Two accelerometers are low-g analog accelerometers 255 and 260, two are digital accelerometers 270 and 275, and one is a high-g analog accelerometer 265. Other combinations of the different types of accelerometers may be used. Accelerometers measure acceleration forces, including constant forces such as gravity and dynamic forces caused by movement and vibration. For the flow switch algorithm, the constant force of gravity may be filtered out such that only dynamic forces are measured to determine mud flow. One method by which to filter out constant forces is to rely on standard deviations, rather than the means, of force measurements from the accelerometers. Analog accelerometers continuously output voltage values that are proportional to acceleration. The output voltage waveform may be sampled at any particular rate and converted to a digital measurement using an analog-to-digital converter. The low-g analog accelerometers 255 and 260, which are suited to measure low acceleration forces, are sampled and passed through a low pass filter to remove high frequency signal noise. Digital accelerometers are inherently insensitive to high frequency vibrations because they have built-in low pass filters. They typically do not need further filtering, but additional filtering can be added as needed for signal conditioning.

FIG. 3 illustrates a block diagram of one possible embodiment of a flow switch voting algorithm. Although FIG. 3 depicts four series of steps corresponding to four individual accelerometers (300, 310, 320, and 330), the actual number of accelerometers can vary without departing from the spirit or scope of the present invention. First, in steps 301, 311, 321, and 331, the vector norms of the accelerometers are taken and individually stored in a buffer. The vector norms represent the absolute value of acceleration measured by the accelerometers. At steps 302, 312, 322, and 332, the mean and standard deviation of the values stored in the acceleration buffer are calculated at a specified rate. The standard deviation can then be further low-pass-filtered as necessary to remove unreasonably low or high values. Such extremely high or low values may also be error logged.

As shown at 303, 313, 323, and 333, standard deviations may be categorized, or binned. Through empirical data, it has been determined that filtered standard deviation values correspond with various levels of vibration. One example for categorizing standard deviation values into levels follows. The levels of vibration detected by the accelerometers can be correlated with various mud flow states, such as "strongly off," "weakly off," "weakly on," or "strongly on." Each of these states can be assigned an associated weight, such as −2, −1, 1, and 2. Based on various factors such as the number, type, sensitivity, and quality of accelerometers used, more or fewer mud flow states may be used. As shown at 304, 314, 324, and 334, binned data may then be weighted, depending on various factors such as the number, type, sensitivity, and quality of accelerometers used. The weighted values from the accelerometers may then be aggregated or summed, as shown at 340. If the sum is greater than or equal to a predetermined threshold value, the flow is considered on. For the example described above, the threshold value may be a value greater than zero.

Additional modifications can be made to the voting algorithm based on actual accelerometer sensitivity. For example, if the high-g analog accelerometer is insensitive to low-g accelerations, then the weights associated with "weakly off" and "weakly on" can be set to zero, effectively reducing the number of states for that given accelerometer. As another example, for very sensitive or very accurate accelerometers, additional states may be added, such as "moderately off" and "moderately on." In this way, various accelerometer configurations and sensitivities may be accommodated into the flow switch voting algorithm.

In one embodiment, the flow switch circuit may recognize when an accelerometer has failed, and the flow switch circuit may further disqualify data received from that accelerometer in the determination of flow state. An accelerometer may be identified as having failed if the accelerometer continuously only reports a single value, for example, railing high or railing low during operation. In an embodiment, accelerometers may be paired or grouped together such that their outputs may be compared against each other. For example, two low-g accelerometers may be paired together. The two outputs from the accelerometers are expected to be similar to each other, while they may have some differences in exact output values. However, if the two accelerometers are consistently outputting values that differ significantly, then it is likely that one has failed. Data from both accelerometers may be discarded, or further data comparisons may be conducted with other accelerometers to identify the failing accelerometer.

FIG. 4 shows a block diagram of an exemplary method 400 for determining a flow state using a voting algorithm. Several of the steps have been described above with respect to FIG. 3. At step 405, data from the different accelerometers is received. At step 410, the data from the different accelerometers is weighted based on weighting criteria that may be predetermined At step 415, flow values are assigned to the different data (i.e. binning), and the values are combined in step 420 to determine a flow state. This flow state can be used to determine whether the pulser should be triggered by the pulser driver to generate pressure pulse communications.

In an embodiment, the orientation module 102 includes a multiprocessor unit that directs the operation of the tool. The multiprocessor unit may receive the flow state information, determine when pulse communications should be started, and send pulse commands to the pulser driver 201 to generate pulses.

Returning to method 400, at step 425, it is determined whether the flow state has changed from the previously determined flow state. If the flow state has changed, for example from "off" to "on," then the flow switch circuitry may wait for a threshold period of time to determine whether the flow state will change again, as shown at step 430. Step 430 may also not be implemented if standard deviation values are low-pass filtered, as acceleration spikes will be filtered out of the flow state determination. If the flow state is confirmed after the threshold wait, as shown at 435, then the pulser may be activated to generate pressure pulses for mud telemetry (or deactivated if the state changed from "on" to "off"). As mentioned above, in an embodiment, the flow state confirmation may trigger other flow processes in the MWD tool. The threshold wait time may be used to prevent the pulser driver circuitry from cycling between "on" and "off" states when the flow state is transitioning rapidly back and forth between the two states.

The threshold time to turn the pulser on may be set at a predetermined value. For example, if the rate at which pressure pulses for mud telemetry are generated is known, the threshold time may be set to be a value dependent upon that rate. In other words, there is no need for the mud pulse telemetry system to attempt to generate pressure pulses if the flow switch indicates that the mud flow is not active long enough for the encoded pulses to be sent. This can help conserve power for the pulser driver.

The threshold may also be implemented as a count value. For example, if the threshold count value is five, then the flow state is determined to have changed after five consecutive, consistent readings confirming that the flow state has changed. In this way, threshold times or values may be used to confirm a flow state change and prevent unnecessary cycling of the pulser.

Additionally, the threshold time for switching states may also be implemented with a non-linear response, where, for example, the wait time to switch from an "on" to "off" state is different than the wait time to switch from "off" to "on."

Although the concepts disclosed herein have been described in connection with the preferred form of practicing them and modifications thereto, those of ordinary skill in the art will understand that many other modifications can be made thereto. Accordingly, it is not intended that the scope of these concepts in any way be limited by the above description.

The invention claimed is:

1. A measurement while drilling tool comprising:
  a flow switch circuit comprising:
    a plurality of accelerometers configured to detect, respectively, flow values of fluid flow and output the flow values; and
    a microprocessor configured to input the flow values from the plurality of accelerometers and identify a fluid flow state,
  wherein the measurement while drilling tool initiates fluid flow processes after the microprocessor identifies a predetermined fluid flow state.

2. The measurement while drilling tool of claim 1, wherein the flow switch circuit further comprises one or more memory elements to store flow data.

3. The measurement while drilling tool of claim 1, wherein the plurality of accelerometers comprise at least one low-g analog accelerometer.

4. The measurement while drilling tool of claim 1, wherein the plurality of accelerometers comprise at least one high-g analog accelerometer.

5. The measurement while drilling tool of claim 1, wherein the plurality of accelerometers comprise at least one digital accelerometer.

6. The measurement while drilling tool of claim 1, further comprising a main valve to generate pressure pulses.

7. The measurement while drilling tool of claim 6, wherein the main valve stops generating pressure pulses when the microprocessor identifies a different predetermined fluid flow state.

8. The measurement while drilling tool of claim 1, wherein the microprocessor is further configured to confirm a fluid flow state change after identifying a consistent fluid flow state over a threshold period of time.

9. The measurement while drilling tool of claim 1, wherein the microprocessor is further configured to confirm a fluid flow state change after identifying a consistent fluid flow state over a threshold count.

10. The measurement while drilling tool of claim 6, further comprising input/output ports communicatively coupled with a gamma ray detector, wherein the microprocessor is further configured to receive and encode gamma ray data from the gamma ray detector through the input/output ports, and wherein the main valve is configured to generate pulses to transmit encoded gamma ray data after the microprocessor identifies a predetermined fluid flow state.

11. The measurement while drilling tool of claim 6, further comprising input/output ports communicatively coupled with an orientation module, wherein the microprocessor is further configured to receive and encode orientation data from the orientation module through the input/output ports, and wherein the main valve is configured to generate pulses to transmit encoded orientation data after the microprocessor identifies a predetermined fluid flow state.

12. The measurement while drilling tool of claim 1, wherein the microprocessor is further configured to identify a failed accelerometer and identify the fluid flow state without the flow values from the failed accelerometer.

\* \* \* \* \*